(12) United States Patent
Krienke

(10) Patent No.: US 8,206,501 B2
(45) Date of Patent: Jun. 26, 2012

(54) HEAT AND RAIN EROSION RESISTANT COATING

(76) Inventor: Kenneth A. Krienke, Seattle, WA (US)

(*) Notice: Subject to any disclaimer, the term of this patent is extended or adjusted under 35 U.S.C. 154(b) by 100 days.

(21) Appl. No.: 12/750,349

(22) Filed: Mar. 30, 2010

(65) Prior Publication Data

US 2010/0183887 A1    Jul. 22, 2010

Related U.S. Application Data

(62) Division of application No. 11/302,630, filed on Dec. 14, 2005, now Pat. No. 7,713,347.

(51) Int. Cl.
    *C08G 77/08* (2006.01)
(52) U.S. Cl. ............... 106/287.13; 106/287.14; 427/387
(58) Field of Classification Search ............ 106/287.13, 106/287.14; 427/387
    See application file for complete search history.

(56) References Cited

U.S. PATENT DOCUMENTS

| | | | |
|---|---|---|---|
| 2,450,327 A | 9/1948 | Cogan et al. | |
| 3,412,063 A | 11/1968 | Jarboe et al. | |
| 4,741,778 A * | 5/1988 | Horie et al. | 106/287.16 |
| 4,746,366 A * | 5/1988 | Philipp et al. | 106/287.19 |
| 4,754,012 A | 6/1988 | Yoldas et al. | |
| 5,789,085 A | 8/1998 | Blohowiak et al. | |
| 5,814,137 A | 9/1998 | Blohowiak et al. | |
| 5,849,110 A | 12/1998 | Blohowiak et al. | |
| 5,869,140 A | 2/1999 | Blohowiak et al. | |
| 5,869,141 A | 2/1999 | Blohowiak et al. | |
| 5,939,197 A | 8/1999 | Blohowiak et al. | |
| 5,958,578 A | 9/1999 | Blohowiak et al. | |
| 6,037,060 A | 3/2000 | Blohowiak et al. | |
| 6,086,664 A | 7/2000 | Blohowiak et al. | |
| 6,506,499 B1 | 1/2003 | Blohowiak et al. | |
| 6,605,365 B1 * | 8/2003 | Krienke et al. | 428/328 |
| 6,770,371 B2 | 8/2004 | Stephenson et al. | |
| 2004/0005455 A1 | 1/2004 | Stephenson et al. | |
| 2004/0009344 A1 | 1/2004 | Krienke et al. | |
| 2005/0229816 A1 | 10/2005 | Krienke et al. | |

FOREIGN PATENT DOCUMENTS

EP    1 380 626    1/2004

OTHER PUBLICATIONS

Search Report and Written Opinion for PCT/US2006/045594 dated Jan. 14, 2008.
European Search Report Application No. 06 851 468.6 dated Apr. 9, 2009.

* cited by examiner

*Primary Examiner* — Margaret Moore
(74) *Attorney, Agent, or Firm* — Alston & Bird LLP

(57) ABSTRACT

A binder formulation is provided that is capable of forming a heat and erosion resistant coating on the surface of a substrate, particularly a substrate comprising titanium or aluminum. The binder formulation comprises a metal alkoxide compound, such as a titanium alkoxide and an organosilane, such as 3-glycidoxypropyltrimethoxysilane (GTMS). The binder material may be capable of strongly bonding the binder to the substrate. The binder coating may also include one or more additives that may help improve the heat resistance and impact absorbance of the coating. The binder may also include one or more pigments so that the resulting sol-gel coating has a desired appearance and properties. The sol-gel coating can be cured under ambient conditions and does not require additional heat curing.

18 Claims, No Drawings

HEAT AND RAIN EROSION RESISTANT COATING

CROSS REFERENCE TO RELATED APPLICATIONS

This application is a divisional of U.S. patent application Ser. No. 11/302,630, filed Dec. 14, 2005, now U.S. Pat. No. 7,713,347, which is hereby incorporated herein in its entirety by reference.

FEDERALLY SPONSORED RESEARCH OR DEVELOPMENT

This invention was made with Government support under Contract No. F33657-01-D-2000 awarded by the Air Force. The government has certain rights in this invention.

BACKGROUND OF THE INVENTION

In some circumstances, a portion of an aircraft's jet engine exhaust plume may contact various portions of the aircraft's surfaces during operation. Such contact may result in localized heating of the contacted surfaces. Depending on the type of aircraft and the location of the engine(s), the contacted surfaces may include portions of the fuselage, control surfaces, and/or wings. Some aircraft utilize thrust reversers that help maneuver the aircraft while on the ground. In some cases, the thrust reversers may direct hot engine exhaust gases over a surface of the aircraft. For instance, thrust reversers on some aircraft may direct hot exhaust gases over a leading edge of the wing. The hot exhaust gases may cause thermal degradation of conventional coatings that may be present on the surface of the aircraft, such as the leading edge of the wing. Thermal degradation of the coating may result in an undesirable appearance of the coating among other deleterious effects.

In aircraft applications, thermal degradation of the coating may be magnified as a result of impacts with high velocity rain drops. Impacts with rain drops during flight may further damage and erode the coating. In cases where the coating is already stressed, such impacts may cause significant damage to the coating including, for example, exposure of the underlying metal.

Exposed metal may be especially problematic in military applications where reduced visibility of the aircraft may be desirable. Many military aircraft may have a camouflage coating that is designed to reduce the visibility of the aircraft. Bare metal may result in a highly reflective surface that may compromise the overall effectiveness of the camouflage coating system.

Commercially available high temperature coatings have been developed that can withstand high temperatures. However many of these coatings may have disadvantages that may make them undesirable for use on aircraft. For instance, some high temperature coatings may have insufficient resistance to the repetitive impact of high velocity rain droplets during flight. In some cases, these coatings may be damaged and fail as a result.

In other cases, the coatings may not readily adhere to the aircraft surface and may require specialized treatments of the surface to be coated. Surface roughening treatments, such as grit blasting, may initially lead to improved coating adhesion, but are typically labor intensive and may be difficult to perform in aircraft paint hangar environments. Aircraft parts with grit blasted surfaces may also be more difficult to strip and re-clean prior to re-painting at some later time. Some coatings may need to be heat cured for the coating to obtain the desired properties. In many cases, it may not be possible to heat cure the coating, this may be especially true in the case of large winged aircraft.

Additionally, some coatings can only be applied by specialized processing equipment in factory environments. In some circumstances, the parts to be coated may need to be removed from the aircraft. Applying such coatings to existing aircraft may not always be feasible because of the high costs that may be associated with such operations and delays that may be introduced into aircraft painting and re-painting operations.

Thus, there still exists a need for a heat and erosion resistant coating that can be applied without extensive pretreatment of the surface to be coated and without heat curing or the use of specialized processing equipment.

BRIEF SUMMARY OF THE INVENTION

Embodiments of the invention provide a sol-gel for coating metal surfaces and composite substrates that overcomes many of the aforementioned problems. In one embodiment, a sol-gel comprising an organosilane compound and a metal alkoxide, such as titanium ethoxide is provided. The organosilane and titanium ethoxide function as a binder that forms a film coating on the surface of the substrate. The functional moieties on the organosilane molecules are capable of forming strong covalent bonds with the substrate. The presence of the titanium ethoxide may also help form covalent bonds between the substrate and the coating and may also serve as a catalyst that improves the rate at which the organosilane compound crosslinks or polymerizes to form a film coating on the surface of the substrate. In one embodiment, the organosilane may comprise 3-glycidoxypropyltrimethoxysilane (GTMS).

In one embodiment, the sol-gel coating may include water as a solvent. In other embodiments, the sol-gel coating may also include an activator for activating the binder. In some embodiments, the sol-gel coating may have a relatively low water content in comparison to the binder components, typically less than 40 volume percent. The titanium ethoxide binder can be chelated with various compounds to produce water soluble complexes that are compatible with water and GTMS. As a result, in one embodiment of the invention, a water based sol-gel is provided that includes a reactive metal alkoxide that may speed coating cure rates under ambient conditions.

In one embodiment, sol-gel may include one or more pigments and one or more additives that may help improve the erosion resistance and heat resistance of the coating. In some embodiments, the pigment(s) may be selected so that resulting coating has a desired appearance, reflectivity, gloss, color, and the like. The erosion resistance of the coating may be improved by a high pigment/additive loading within the sol-gel. In some embodiments, the pigment/additive loading may be from about 20 to 40 volume percent based on the volume of the organosilane and the titanium alkoxide components. The high pigment loadings may help reinforce the resulting films so that as the binder reagents (i.e., organosilane and the titanium alkoxide) shrink during curing, stresses within the binder may be reduced. As a result, the overall strength and erosion resistance of the coating may be improved.

In one embodiment, the sol-gel may include one or more additives that improve the erosion resistance and/or heat resistance of the coating. Particulate matter having a flake-like structure and an average diameter between 1 and 20 microns may be particularly useful for improving the erosion resistance of the coating. It is believed that when such flake like particles are incorporated into the sol-gel at a relatively high pigment loading they may help counteract the stresses in the coating as it cures. Mica is a particularly useful additive that may help improve both the heat and erosion resistance of the coating. In one embodiment, the coating may be able to withstand temperatures in excess of 800° F., 900° F., and even in excess of 1200° F., depending on the pigments used and the type of substrate material to which the coating is applied.

Thus, embodiments of the invention provide a coating having improved heat and erosion resistance and that is capable of curing under ambient conditions and thereby may reduce, if not eliminate, the need for heat curing.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Embodiments of the invention provide a sol-gel that is capable of forming a heat and erosion resistant coating on the surface of a substrate, particularly a substrate comprising titanium or aluminum. In one embodiment, the invented sol-gel includes a binder comprising a metallic alkoxide compound, such as a titanium alkoxide, and an organosilane, such as 3-glycidoxypropyltrimethoxysilane (GTMS). The binder material may be capable of strongly bonding the binder to the substrate. The sol-gel coating may also include one or more additives that may help improve the heat resistance and impact absorbance of the coating. The sol-gel may also include one or more pigments so that the resulting sol-gel coating has a desired appearance and properties.

The term "sol-gel," is a contraction of solution-gelation, and refers to a method for preparing specialty metal oxide glasses and ceramics by hydrolyzing a chemical precursor or mixture of chemical precursors that pass sequentially through a solution state and a gel state before being hydrated to a glass or ceramic. 22 Kirk-Othmer, ENCYCLOPEDIA OF CHEMICAL TECHNOLOGY, 69-81 (4$^{th}$ Ed. 1997), Within the context of the invention, the chemical precursors used to prepare the binder for the sol-gel coatings include organosilane and metal alkoxide reagents. The metal alkoxide component may be pre-reacted with organic chelating agents to reduce their rates of hydrolysis and increase their stability in aqueous coating systems. The organosilane component may provide an organically modified silica network that forms the backbone of the coating network.

In one embodiment, the sol-gel coating contains a relatively high concentration of binder and pigments/additives with respect to the amount of solvent. As a result, the sol-gel solution can provide a coating material having a relatively high viscosity. The relatively low solvent content in the sol-gel permits the sol-gel to form a film-like coating in which the organosilane molecules polymerize into a substantially continuous network of silane groups having a structure with relatively low porosity. While not wishing to be bound by theory, Applicant believes that the silanol and epoxy groups of the organosilane molecules may covalently bond to the surface of the substrate and/or with other organosilane molecules through a condensation reaction process. As a result, the sol-gel may be capable of forming strong bonds at the interface between the sol-gel and the substrate. As discussed in greater detail below, the addition of the metal alkoxide compound may help catalyze the condensation reaction of the organosilane compound so that the resulting coating may obtain adequate levels of desired properties, such as hardness, without relying on elevated temperature curing. In some embodiments, the coating may develop the desired properties under ambient temperature without the requirement of heat curing. This may be particularly useful in applications where the coating is being applied under field conditions. It is also believed that the metal alkoxide compound may also be able to bond with the surface of the substrate, although to a lesser extent.

In addition, to having a relatively low solvent content, Applicant has discovered that the rain erosion resistance of the coating may be improved by having a high level of pigments and/or additives in the sol-gel, with respect to volume percent of the binder. In the context of the invention, the amount of pigments and additives in the sol-gel is collectively referred to as the "pigment loading level". It is believed that a high a pigment loading level may help reduce internal stresses that may occur in the binder during curing. High pigment loading levels may also increase the amount of hard particulate matter dispersed throughout the coating. As a result, when a high velocity particle, such as a rain drop, impacts the coated surface it is more likely to strike a hard particle that is better able to withstand the impact than the sol-gel binder by itself.

Suitable organometallic compounds may include alkoxide metallic compounds, such as titanium alkoxide. Particularly useful titanium compounds are of the general formula $Ti(OR)_4$ wherein R is a lower aliphatic having 2-5 carbon atoms, especially normal aliphatic groups. In one embodiment, the titanium alkoxide compounds may have the general formula $Ti(OR_n)$, where n is a number from 1 to 5. Titanium ethoxide is a particularly useful titanium alkoxide that may be used in the sol-gel. Alkoxide metallic compounds having branched aliphatic, alicyclic, or aryl groups may also perform satisfactorily. In addition to covalently bonding to the metal surface, the titanium alkoxide compound may also help to minimize the diffusion of oxygen to the surface and to stabilize the metal-resin interface.

Applicants have found that specific metal alkoxides, such as titanium ethoxide, may be more effective than other metal alkoxides in helping to accelerate the rate at which the condensation reactions occur between the substrate and the sol-gel and may help improve the ultimate strength and hardness of the resulting coating. It is believed by the Applicant that the titanium ethoxide may have a catalytic effect on the condensation reactions that occur between the silanol groups and the epoxy group of the organosilane compound and the substrate. As discussed above, the use of titanium ethoxide has permitted the sol-gel coatings to cure in a relatively short time. This may be particularly advantageous in applications where it may be desirable to apply the coating in a field application, such as an aircraft hanger. As a result, the sol-gel coating of the embodiments of the invention may be applied in the absence of specialized equipment and extensive curing techniques.

In some embodiments, it may be desirable to complex the metal alkoxide compound with a chelating agent. The presence of the chelating agent may increase the solubility of the metal alkoxide in certain solvents, such as water. Additionally, it is believed that the combination of the chelating agent and the metal alkoxide may also help improve the rate of the condensation reaction and catalyze the reaction between the sol-gel and the substrate. Suitable chelating agents may include, but are not limited to, glacial acetic acid, citric acid, 2,4-pentandione, triethanolamine, glycols, ethoxyethanol, $H_2NCH_2CH_2OH$, and the like. In one embodiment, the amount of chelating agent that is used may be the minimum amount necessary to form the titanium-metal alkoxide complex.

Glycidoxysilanes may be particularly useful organosilanes because of their stability in solution and their ability to crosslink with common, aerospace epoxy or urethane adhesives. In some embodiments, the silane may be acid-base neutral, so its presence in the sol mixture does not significantly increase the relative hydrolysis and condensation rates of the metal alkoxide compounds.

A particularly useful organosilane for use in the invented sol-gel is 3-glycidoxypropyltrimethoxysilane (GTMS). The GTMS includes an active epoxy group which can react with common epoxy and urethane resins. The ideal concentration of the organosilane may depend upon the specific performance requirements for a given application. The Applicant believes the presence of the epoxy functional group and the short organic chain attaches to the silicon atom of the GTMS molecule may add flexibility to coatings for some applications. Use of GTMS with the titanium alkoxides may permit strong covalent bonding to develop between the metal substrate and the epoxy moieties of the GTMS. Other tri-alkoxy organosilanes that may be used include those with 3-aminopropyl or methacryloxy functionalities, although not necessarily with equivalent results.

As discussed above, the rain erosion performance of the coating may be improved by high pigment and additive loading of the sol-gel binder. In one embodiment, the sol-gel may have a pigment loading level in excess of 20 volume percent, based on the volume of the sol-gel binder. In other embodiments, the pigment loading level may range from about 20 to 40 volume percent, based on the volume of the sol-gel binder reagents. In other embodiments, the combined pigment and additive loading level may range from about 5 to 40 volume percent, based on the volume of the sol-gel binder reagents, with pigment loading levels between 2 and 30 volume percent and 15 to 30 volume percent being useful. In one embodiment, the sol-gel has a pigment loading level of at least about 35 volume percent based on the volume of the binder. The high pigment loading level may help reinforce the resulting coating so that it may be more resistant to erosion from rain and other particulate matter. Typically, the reagents in the binder, e.g., the organosilane, may undergo significant shrinkage after being hydrolyzed with water and then allowed to cure. During the curing process, water, alcohol, and some organics, such as esters, may evaporate from the coating. In addition, the silane and epoxy moieties covalently bond to the substrate and each other through a condensation reaction process that results in the release of water. As the curing process proceeds, water is continuously removed from the coating which may result in shrinkage of the coating. Such shrinkage may cause stresses and cracking within the coating. It is believed that the high pigment loading may help reduce the amount of binder material that surrounds the individual pigment and additive particles within the binder. As a result, the amount of shrinkage within the coating may be reduced and thereby the stresses that may cause cracks and points of weakening within the binder may likewise be reduced.

In one embodiment, the sol-gel may include reinforcing additives that may help improve the strength and rain erosion resistance of the sol-gel coating. Suitable reinforcing additives may include mica, ceramic flakes, metallic flakes, such as aluminum, clay particles, and the like. Additives having a flake-like structure, such as mica, may be particularly useful in improving the rain erosion properties of the sol-gel coating. It is believed that the presence of these flake-like particles at pigment loading levels in excess of 2 volume percent, based on the volume of the binder, may permit enhanced contact between adjoining platelet surfaces to thereby produce a reinforcing effect that may result in improving the strength of the sol-gel coating. The sol-gel may include from about to 2.5 to 40 volume percent of a reinforcing agent, with 8 to 20 volume percent also being useful. The flake-like additives may have an average diameter that ranges from about 1 to 20 microns. In one embodiment, the sol-gel includes mica particles that are present in an amount from about 2 to 40 volume percent, based on the volume of the binder.

In some embodiments, the sol-gel may also include one or more heat resistant additives that may be used to help improve the heat resistance of the sol-gel coating. In one embodiment, mica particles may be also used to help improve the heat resistance of the coating. The presence of mica particles may improve the ability of the sol-gel coating to resist damage when heated to temperatures in excess of 400° F. In some embodiments, the presence of the mica particles may help the coating to withstand temperatures in excess of 700°, 800°, 1000°, and even 1200° F. It is believed that the increase in temperature resistance may be at least partially a result of the high temperature resistance of mica itself and the film reinforcing effects contributed by the high aspect ratio of the mica particles when present at higher loading levels as described above.

In addition to the heat resistant and reinforcing additives discussed above, the sol-gel may also include one or more pigments to control color, gloss, reflectivity, electrical conductivity, emissivity, or combinations thereof. In one embodiment, the sol-gel provides a coating that meets color and reflectivity requirements of Federal Standard color 36173. In high temperature applications, it may be desirable to utilize inorganic pigments to prevent changes in color that may occur as a result of charring of any organics that may be present in the coating. In some embodiments, the sol-gel may also include a flatting agent to help control the level of gloss in the coating. In one embodiment, the flatting agent may be present in an amount from about 2 to 10 volume percent, based on the volume of the binder.

The concentrations of the reactants in the sol-gel are generally expressed in terms of volume percentages. In one embodiment, the binder components are solubilized in a solvent, such as water. As discussed above, the coating may have a high volume percentage of the binder and pigments/additive components and a correspondingly low volume percentage of the water. Having a low volume percentage of water may result in a binder having a network of silicon and oxygen atoms having a relatively closed structure. A closed structure may improve the overall strength and bonding characteristics of the sol-gel. In some embodiments, a high water or solvent content within the binder may be undesirable because it may result in the formation of cracks and other defects in the coating as water leaves the binder and the coating is cured.

Typically, the amount of solvent, such as water, that may be present in the sol-gel may be at least enough to hydrolyze the organosilane and metal alkoxide molecules. Complete hydrolysis and condensation of the organometallic in the sol-gel film may be important to develop a hydrolytically stable metal oxide film in the metal. The presence of hydrolyzable alkoxides in the sol-gel film may have two adverse effects. First, every residual alkoxide represents an incomplete condensation site between the metal and the organosilane. Incomplete condensation may decrease the ultimate bond strength of the sol-gel coating. Second, in a humid environment, these alkoxide residues can hydrolyze. The structural changes accompanying hydrolysis cause stress in the sol-gel coating which may promote failure to occur within the sol-gel coating at the interface of the substrate and the coating.

In comparison to prior sol-gel compositions, the inventive sol-gel may be able to form a relatively thick layer on the surface of the substrate. This may be in due, at least in part, to the relatively high pigment loading and relatively low water content that may be present in the sol-gel. In one embodiment, the sol-gel coating may be from about 1 to 20 microns in thickness. In some embodiments, the sol-gel may be able to produce a desired coating after only a single application. In other embodiments, it may be desirable to apply the sol-gel in multiple applications or coating layers. The sol-gel may have a viscosity as measured with a #2 Zahn cup between about 20 and 35 seconds. In one embodiment, the #2 Zahn cup viscosity may be from about 25 to 30 seconds.

The organometallic and the organosilane components of the sol-gel hydrolyze at different rates. If the sol is applied too shortly after being made, the organosilane may not be fully hydrolyzed. If the sol is not applied soon enough, the hydrolyzed silicon and organometallic components may condense among themselves, forming oligomers and networks. In the absence of the additives/pigments, the ideal solution age is at the point that the titanium and silicon are hydrolyzed sufficiently that titanium and silicon react with the metal surface and from a strong organic-inorganic film network.

In sols containing titanium alkoxides, the titanium and silicon components may hydrolyze on a similar time scale when the titanium alkoxide is mixed with glacial acetic acid. Given that the relative rates of the hydrolysis and condensation reactions involved in the sol-gel coating process depend upon the concentrations of the reagents in the reactions, the metal alkoxide selected, and the water available for hydrolysis, the minimum amount of acetic acid necessary to form the titanium-acetic acid complex is used. By way of example, in one embodiment of the sol-gel having about 50% binder (GTMS and titanium ethoxide) in a water solution, acetic acid is needed in an amount of about 1 to 5 moles per mole of titanium ethoxide used.

The sol-gel may be prepared by first mixing GTMS and titanium ethoxide in a medium of water and acetic acid. In some embodiments, the titanium ethoxide may be complexed with the acetic acid prior to mixing with water or the GTMS. The GTMS and titanium ethoxide may be present in a molar ratio ranging from about of about 1:0.7 to 2:1. The binder (GTMS and titanium ethoxide) may comprise about 40% to about 70% of the total volume of the mixture. In one embodiment, the binder may comprise about 50% of the total volume of the mixture. In some embodiments, the predominate component of the mixture may be water, which may be present in an amount from about 20% to about 40% of the total volume of the mixture. The acetic acid component of the mixture may comprise about 15% to about 25% of the mixture, based on the total volume of the mixture. A slightly higher concentration of reactants may yield better results in some situations, depending on the bonding materials and conditions. The ratio of GTMS to titanium ethoxide may be adjusted to obtain the strongest surface adherence for each particular situation and to adjust the time necessary for curing.

In one embodiment, the binder/water mixture may comprise between about 25 to 35 volume percent GTMS; between about 15 to 35 volume percent titanium ethoxide; between about 10 to 35 volume percent acetic acid; and between about 25 to 35 volume percent water. In one embodiment, the binder water mixture may comprise less than 30 volume percent water. It should be recognized that the amount of each reagent may be adjusted to control the ultimate properties of the sol-gel. For instance, in spray on application it may be desirable to increase the relative water content to further improve the sprayability of the sol-gel. In other embodiments, sprayability may not be a concern and it may be desirable to decrease the water content to adjust the amount of time necessary for curing.

Mixing of the sol-gel binder reagent may occur over a 15 to 30 minute period and use of hand or mechanical agitation of the solution containers may be used to mix the components before they are mixed with the pigments and additives. The base sol-gel mixture is stirred, typically from about 15 to 30 minutes or more, to allow for proper dispersion of the binder components within the water and acid mixture. After stirring of the sol-gel mixture, the one or more pigments may be added to the binder/water mixture and mechanically shaken for about 20 minutes or more. Glass beads may be used to increase the dispersion of the pigments in the binder. The glass beads are typically removed from the mixed coating prior to application. The pigment/additive components may be present at a pigment loading level that is from about 20 to 40 volume percent based on the total volume of the binder reagents (GTMS and titanium ethoxide). In one embodiment, the pigment/additive components may be present at a pigment loading level that is from about 30 to 40, or 30 to 35 volume percent.

The sol-gel can be applied using conventional paint application techniques such as HVLP spray guns, foam rollers, or the like. Once applied, the sol-gel coating can air dry and can cure under ambient conditions. Depending upon the composition of the sol-gel coating formulation, environmental conditions, such as humidity, and the thickness of the applied coating, curing may take from 2 to 7 days. In some embodiments, curing may take from about 2 to 3 days. The application of heat to the coated parts may increase the rate at which the coating dries and speed the development of hardness. As described in the Examples below, the resulting sol-gel has improved hardness in comparison to sol-gel coatings comprising tetra-n-propoxyzirconium. The pencil hardness of the sol-gel coating may increase with an increased duration of air drying or with application of heat. In one embodiment, the air-dried sol-gel coating has a marked pencil hardness of at least 2B, B, HB, F, H, 2H, 3H, 4H, 5H, 6H, 7H, 8H, or 9H. In another embodiment, the sol-gel coating has a pitted pencil hardness of at least 7H to 8H, and cannot be gouged by pencils of increasing hardness through 9H. In one embodiment, the sol-gel coating has a percent volume loading of about 35 PVC and a marked pencil hardness of at least 5H, a pitted pencil hardness of at least 6H, and has a gouged pencil hardness greater than 9H. The pencil hardness designations are described in greater detail below.

In one embodiment, the precursors to the sol-gel may be available in a kit that can be mixed prior to application and use. In some embodiments, the kit may include the binder reagents packaged separately. This may help improve the stable shelf-life of the reagents. The pigments and one or more additives may also be stored separately from the binder reagents. After mixing of the binder components, the pigments/additives may then be added to the binder mixture.

EXAMPLES

The following exemplifies an inventive sol-gel coating having the desired heat and rain erosion resistance and that meets color and reflectivity requirements of Federal Standard color 36173.

TABLE 1

| Component Binder Mixture | Amount (mL) | Volume (%) in binder/water mixture | Pigment Loading %* | Total volume % in sol-gel |
|---|---|---|---|---|
| GTMS | 485 | 29.4 | — | 25.2 |
| titanium ethoxide | 345 | 21 | — | 17.9 |
| glacial acetic acid | 318 | 19.3 | — | 16.5 |
| water | 500 | 30.3 | — | 26 |
| Total Component Pigment/additive misture | 1648 | — | — | 85.6 |
| mica flake | 66.47 | — | 8 | 3.49 |
| flatting agent | 58.38 | — | 7 | 3.03 |
| Kronos 2020 TiO$_2$ | 133.84 | — | 16 | 6.95 |
| carbon black | 3.02 | — | 0.3 | 0.16 |
| Shepard Blue 385 | 8.86 | — | 1.1 | 0.46 |

TABLE 1-continued

| Component Binder Mixture | Amount (mL) | Volume (%) in binder/water mixture | Pigment Loading %* | Total volume % in sol-gel |
|---|---|---|---|---|
| Shepard Brown 20C819 | 6.1 | — | 0.7 | 0.32 |
| Total | 276.7 | — | 33.3 | 14.4 |

*Pigment loading % is based on the total volume of the binder (GTMS and titanium ethoxide)

TABLE 2

| | Hardness | Rain erosion | Viscosity (seconds) |
|---|---|---|---|
| Coating prepared from Sol-Gel of Table 1 | 7H-9H pitted and marked; not gouged. | Slight wear, but no exposed substrate | 21 seconds with a #2 Zahn Cup |

In the following Examples, the pencil hardness of a sol-gel coating in accordance with the invention was compared to a sol-gel coating comprising GTMS. The pencil hardness tests were performed by pushing the tips of pencils of increasing hardness against the coating surface until marks, pits, or gouges were produced in the coating surface. The pencils were held by hand at an angle of approximately 60 degrees with the coating surface. The pencils were pushed down and forward into the coatings in an effort to produce defects in the coating. Prior to performing the test, a flat tip of approximately 1 mm diameter was put on the end of each pencil lead by holding the sharpened tip at an angle of 90 degrees to a piece of 220 grit sandpaper followed by moving the pencil back until the pencil had the desired flat tip. All pencil hardness tests were performed by the same individual. In the context of the invention, the term "marked" refers to a pencil of given hardness that produces a visible mark in the coating; the term "pitted" refers to pencils having sufficient hardness to produce increasingly large pits or craters in the surface of the coating; and the term "gouge" refers to a long trench or channel that is produced in the surface of the coating as the pencil is pushed across the surface of the coating. The term "not gouged" was used to indicate that the pencil could not be gouged with the hardest pencil (here, the hardest pencil used was a 9H pencil). In the context of the invention, the term pencil hardness refers to the hardness of the pencil that is necessary to mark, pit, or gouge the coating. For example, a marked pencil hardness of at least 7H means that in order to make a mark in the coating a pencil having a hardness of at least 7H must be used. Correspondingly, a pitted pencil hardness of at least 8H means that in order to make a pit in the coating a pencil having a hardness of at least 8H must be used. Similarly, the definition also applies with respect to a gouged pencil hardness.

Table 3 recites the pencils used is performing the pencil hardness tests and includes a numerical designation that indicates the relative hardness of each pencil from 0 to 17 in order of increasing hardness. The pencils used in the test are Derwent.Graphic Pencils, which are available from Derwent Cumberland Pencil Co.

TABLE 3

| | Pencil designation | | | | | | | | | | | | | | | | | |
|---|---|---|---|---|---|---|---|---|---|---|---|---|---|---|---|---|---|---|
| | 7B | 6B | 5B | 4B | 3B | 2B | B | HB | F | H | 2H | 3H | 4H | 5H | 6H | 7H | 8H | 9H |
| Relative hardness | 0 | 1 | 2 | 3 | 4 | 5 | 6 | 7 | 8 | 9 | 10 | 11 | 12 | 13 | 14 | 15 | 16 | 17 |

Table 4 compares the pencil hardness of three different coatings having a PVC of 14.5.

Coating A: Binder composition: 79 mole % GTMS and 21 mole % tetra-n-propoxyzirconium;

Coating B: Binder composition: 79 mole % GTMS and 21 mole % titanium ethoxide; and Coating C: Binder composition: 58 mole % GTMS and 42 mole % titanium ethoxide. Coating A, B, and C each have a pigment loading of 14.5 PVC and include the following pigment composition: 2.36 PVC TiO$_2$; 0.14 PVC carbon black; 5.0 PVC mica; 2.0 PVC flatting agent; and 5.0 PVC colloidal silica.

TABLE 4

| Coating Sample | Marked | Pitted | Gouged |
|---|---|---|---|
| A | 1 | 1 | 1 |
| B | 4 | 5 | 5 |
| C | 13 | 13 | 14 |

From Table 4 it can be seen that the presence of the titanium ethoxide in the sol-gel coating results in a sol-gel coating having improved hardness over a similar sol-gel coating comprising tetra-n-propoxyzirconium. The sol-gel coating comprising tetra-n-propoxyzirconium was marked, pitted, and gouged with a 6B pencil. In comparison, the sol-gel coating comprising 21 mole % of titanium ethoxide was not marked until a 3B pencil was used, and was not pitted or gouged until a 2B pencil used. Composition C having an even higher amount of titanium ethoxide had even better hardness results.

Table 5 compares the effect that pigment loading has on the resulting hardness of the sol-gel coating. The sol-gel coatings had the following compositions:

Coating D: Binder composition: 58 mole % GTMS and 42 mole % titanium ethoxide;

Pigment composition: 2.36 PVC TiO$_2$; 0.14 PVC carbon black; 5.0 PVC mica; 2.0 PVC flatting agent; and Coating E: Binder composition: 58 mole % GTMS and 42 mole % titanium ethoxide;

Pigment composition: 16.94 PVC TiO$_2$; 0.382 PVC carbon black; 1.12 PVC blue inorganic pigment; 0.77 PVC brown inorganic pigment; 8.4 PVC mica; and 7.39 PVC flatting agent.

TABLE 5

| Coating Sample | PVC | Marked | Pitted | Gouged |
|---|---|---|---|---|
| D | 9.5 | 9 | 10 | 16 |
| E | 35 | 13 | 14 | Not gouged |

From Table 5 it can be seen that the higher pigment loading dramatically effects the resulting hardness of the sol-gel coating. In particular, it can be seen that a pigment loading of 35 PVC increases the hardness of the pencils that are necessary to mark, pit, or gouge the coating in comparison to the sol-gel coating having a pigment loading of 9.5 PVC.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A temperature resistant and erosion resistant surface treatment for use in coating metal surfaces, said treatment comprising:
   titanium ethoxide;
   3-glycidoxypropyltrimethoxysilane;
   an organic acid; and
   one or more additives that impart erosion resistance, heat resistance, or a combination thereof to the surface treatment, and wherein the one or more additives are present in the surface treatment in an amount from about 20 to 40 volume percent, based on the total volume of the titanium ethoxide and 3-glycidoxypropyltrimethoxysilane in the surface treatment, and wherein the amount of 3-glycidoxypropyltrimethoxysilane is from about 25 to 35 volume percent and the amount of titanium ethoxide is from about 15 to 35 volume percent, based on the total volume of the surface treatment.

2. The surface treatment of claim 1, wherein the surface treatment polymerizes to form a heat and erosion resistant film under ambient temperature conditions, and wherein the film has a temperature resistance of at least 900° F. and a pitted pencil hardness of at least 5H.

3. The surface treatment of claim 1, wherein the surface treatment polymerizes to form a heat and erosion resistant film having a heat resistance at a temperature of at least 800° F.

4. The surface treatment of claim 3, wherein the film meets color and reflectivity requirements of Federal Standard color 36173.

5. The surface treatment of claim 1, wherein the one or more additives include mica flakes having an average diameter from about 1 to 20 microns.

6. The surface treatment of claim 5, wherein the combined percent volume loading of the mica flakes, the one or more additives and optionally, one or more pigments is from about 30 to 40 percent.

7. The surface treatment of claim 1, further comprising water as a solvent and wherein the amount of water in the surface treatment is less than 30 volume percent, based on the total volume of the surface treatment.

8. A method of providing heat and erosion resistance to a surface on an aircraft comprising the step of:
   coating a surface of the aircraft with the surface treatment of claim 1.

9. The method according to claim 8, further comprising the step of permitting the sol-gel to cure under ambient temperature conditions and having a pitted pencil hardness of at least 5H.

10. A temperature resistant and erosion resistant surface treatment for use in coating metal surfaces, said treatment comprising:
    titanium ethoxide;
    3-glycidoxypropyltrimethoxysilane;
    an organic acid; and
    one or more additives that impart erosion resistance, heat resistance, or a combination thereof to the surface treatment, and wherein the one or more additives are present in the surface treatment in an amount from about 20 to 40 volume percent, based on the total volume of the titanium ethoxide and 3-glycidoxypropyltrimethoxysilane in the surface treatment, wherein the one or more additives include mica flakes that are present in a percent volume loading from about 2 to about 10 percent, based on the total volume of titanium ethoxide and organosilane, and wherein the combined percent volume loading of mica flakes, the one or more additives and optionally, one or more pigments is from about 20 to 40 percent, based on the total volume of the titanium ethoxide and 3-glycidoxypropyltrimethoxysilane.

11. The surface treatment of claim 10, the surface treatment polymerizes to form a heat and erosion resistant film under ambient temperature conditions, and wherein the film has a pitted pencil hardness of at least 2B.

12. The surface treatment of claim 10, wherein the surface treatment polymerizes to form a heat and erosion resistant film having a heat resistance at a temperature of at least 800° F.

13. The surface treatment of claim 10, wherein the film meets color and reflectivity requirements of Federal Standard color 36173.

14. The surface treatment of claim 10, wherein the mica flakes having an average diameter from about 1 to 20 microns.

15. The surface treatment of claim 10, the surface treatment polymerizes to form a heat and erosion resistant film under ambient temperature conditions, and wherein the film has a pitted pencil hardness of at least 2B.

16. The surface treatment of claim 10, wherein the combined percent volume loading of the mica flakes, the one or more additives and optionally, one or more pigments is from about 30 to 40 percent.

17. The surface treatment of claim 10, further comprising water as a solvent and wherein the amount of water in the surface treatment is less than 30 volume percent, based on the total volume of the surface treatment.

18. The surface treatment of claim 10, wherein the surface treatment polymerizes to form a heat and erosion resistant film under ambient temperature conditions, and wherein the film has a temperature resistance of at least 900° F. and a pitted pencil hardness of at least 5H.

* * * * *

UNITED STATES PATENT AND TRADEMARK OFFICE
CERTIFICATE OF CORRECTION

| | |
|---|---|
| PATENT NO. | : 8,206,501 B2 |
| APPLICATION NO. | : 12/750349 |
| DATED | : June 26, 2012 |
| INVENTOR(S) | : Krienke |

It is certified that error appears in the above-identified patent and that said Letters Patent is hereby corrected as shown below:

<u>Title page,</u>
Insert the following:
--(73) Assignee: The Boeing Company, Chicago, IL (US)--.

Signed and Sealed this
Fifth Day of February, 2013

Teresa Stanek Rea
*Acting Director of the United States Patent and Trademark Office*